Figure 1:
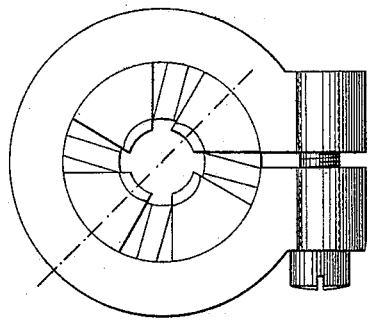

(No Model.) 2 Sheets—Sheet 1.

W. L. DIXON.
METHOD OF MAKING DIES FOR THREADING TOOLS.

No. 451,890. Patented May 5, 1891.

Witnesses. Inventor.
Walter L. Dixon,
by Crosby & Gregory
Attys.

(No Model.)  
2 Sheets—Sheet 2.
W. L. DIXON.
METHOD OF MAKING DIES FOR THREADING TOOLS.
No. 451,890. Patented May 5, 1891.
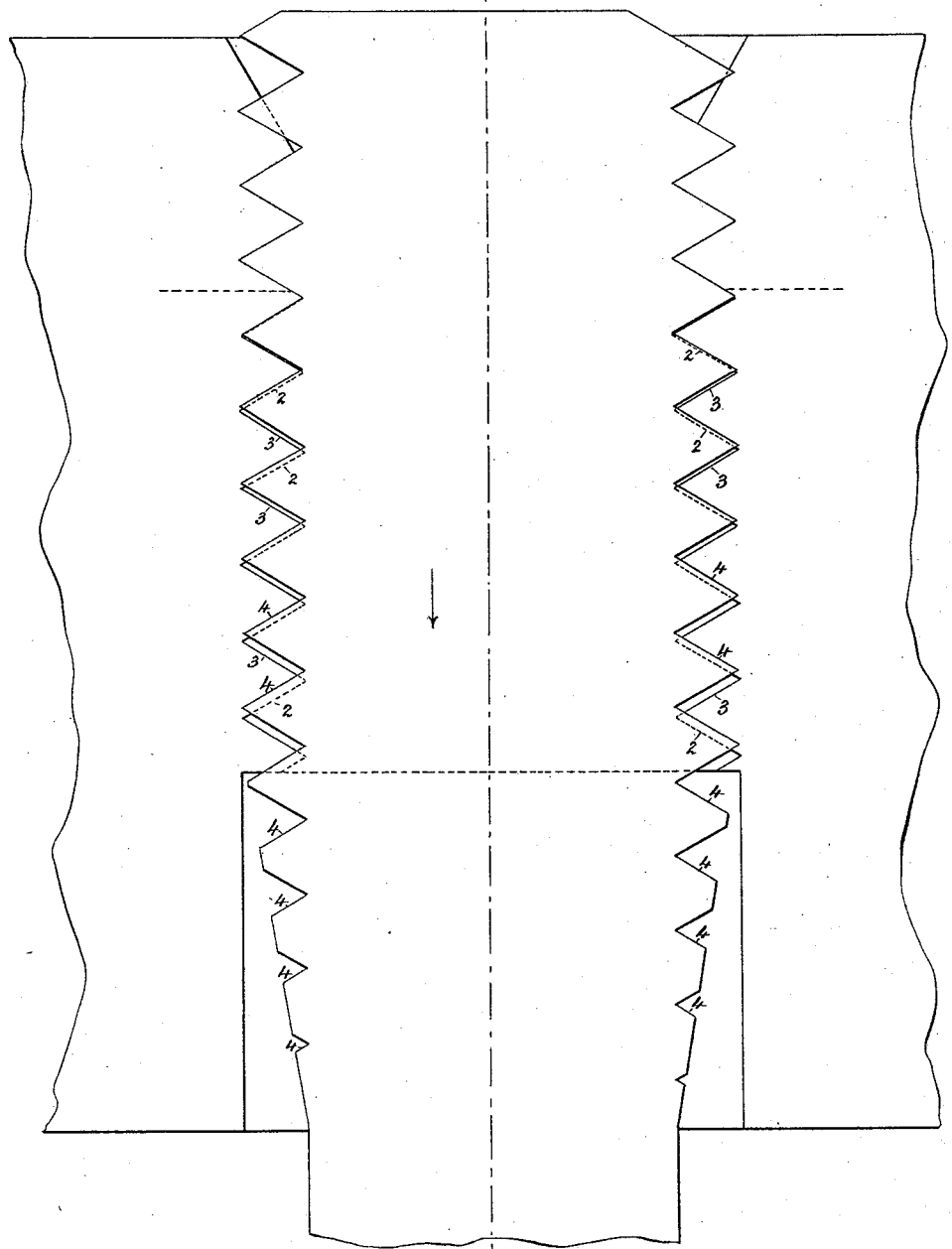

UNITED STATES PATENT OFFICE.

WALTER L. DIXON, OF HOPEDALE, MASSACHUSETTS, ASSIGNOR TO THE HOPEDALE MACHINE SCREW COMPANY, OF SAME PLACE.

METHOD OF MAKING DIES FOR THREADING-TOOLS.

SPECIFICATION forming part of Letters Patent No. 451,890, dated May 5, 1891.

Application filed April 27, 1889. Serial No. 308,781. (No model.)

*To all whom it may concern:*

Be it known that I, WALTER L. DIXON, of Hopedale, county of Worcester, State of Massachusetts, have invented an Improvement in the Method of Manufacturing Dies for Threading-Tools, of which the following description, in connection with the accompanying drawings, is a specification, like letters on the drawings representing like parts.

In the manufacture of dies for cutting threads on screw-blanks the said dies are provided with teeth while the metal is in its soft or untempered state; but when the dies are subsequently hardened the metal of which the die is composed changes its form sufficiently to destroy the accuracy of the die as a threading-tool, for the die in the operation of hardening either expands or contracts, and in either event it becomes impossible to thereafter make on a blank with the said hardened die just the number of threads to the inch that were indicated in the soft die; or, in other words, the hardened die in operation will produce what is called a "fractional thread," or again, in other words, the lead will not be the same as on the tap employed to thread the die. Threading-dies in practice contain a number of teeth which in cross-section have the shape of the thread to be cut on the blank, and of these teeth those which first engage the blank are used as cutters, the remaining teeth of the die performing only the function of a nut to enter and follow in the grooves cut by the cutting-teeth of the die, the said teeth following the cutting-teeth determining the lead of the thread. If a die were made and the cutting-teeth hardened and afterward the leading or guiding teeth were entirely removed—as, for instance, by boring into the die from the rear end and cutting the leading or guiding teeth out—then with such a die it would be impossible to make a screw sufficiently true to be used commercially unless some means should be provided by which to control the longitudinal motion of the die by power, so as to cause it to travel at a uniform rate of speed. If the die should have but two or three cutting-teeth, then such teeth would not furnish sufficient bearing to force the cutting-surfaces into the stock without forcing the thread on the screw out of shape. Ordinarily the greater part of these guiding-teeth are hardened the same as the cutting-teeth. In my experiments I have discovered that this evil of fractional threads or imperfect lead may be obviated by recutting the guiding-teeth of the die after the die has been hardened or tempered; but when hardening or tempering the die care is and must be taken that only the cutting-teeth are hardened, so that the die when the cutting-teeth have been hardened will present the guiding-teeth substantially soft or untempered. In this condition of the die I recut the guiding-teeth by putting through the die a hob-tap or cylindrical cutter, the said hob-tap being, however, preferably of special construction—that is, the said tap consists of a shank having at its rear end a series of leading-threads shaped to exactly correspond with the threads which it is desired to cut on the blank with the die; and at one end of these leading-threads the said hob-tap is preferably tapered somewhat and provided with a series of cutting-teeth, which, after passing the hardened cutting-teeth of the die, act to recut the substantially untempered leading-threads of the die to make them correspond exactly with the lead of the guiding-threads of the hob-tap. In this way it is possible to correct the inaccuracies of the guiding-threads of the die due to the heating and cooling operations referred to.

My invention consists, essentially, in providing a die with guiding and cutting teeth, hardening the cutting-teeth, and thereafter recutting the guiding-teeth, as will be described.

Other features of my invention will be described in the claims at the end of this specification.

Figure 3:
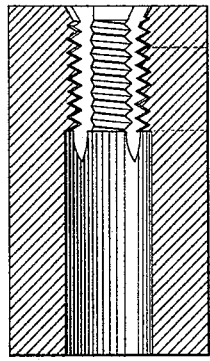
Figure 2:
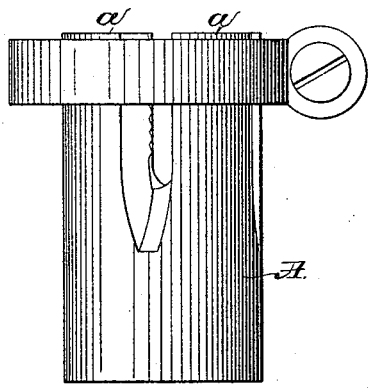
Figure 4:
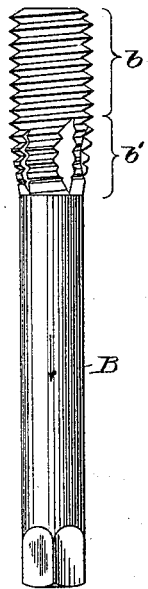

Figure 1 is a view of the front or cutting end of a die embodying my invention, the said die having applied to it a clamp-ring of usual construction. Fig. 2 is a plan view of Fig. 1. Fig. 3 is a longitudinal section through the die without the ring. Fig. 4 shows my improved hob-tap, and Fig. 5 is an enlarged diagram to be referred to in illustrating my improved method of correcting inaccuracies in the guiding threads or teeth of the die.

A may be supposed to represent a die slitted transversely at one end to leave jaws $a$, which at their inner sides are provided with a series of threads or teeth, all but a very few of which near the outer ends of the jaws act as guiding-teeth, the teeth at the immediate ends of the jaws back, say, substantially to the dotted line $x'$ being cutting-teeth, the cutting-teeth in practice cutting the thread on the screw-blank, the other teeth between the line $x'$ and the line $x^2$ being guiding-teeth, and merely following in the grooves made in the blank by the cutting-teeth. These dies, provided with teeth, as described, are in practice hardened substantially throughout the length of the jaws; but in accordance with my invention care is taken to harden only the cutting-teeth, or the teeth extending from the ends of the jaws substantially to the line $x'$, thus leaving the guiding-teeth between the dotted lines $x'$ and $x^2$ substantially untempered or soft.

In practice, by or through the hardening operation or by or through the heating and cooling carried on at such time, the metal of the die is either expanded or contracted, more frequently expanded. As a result thereof it is impossible to cut on the screw-blank a thread just such as the die was originally intended to cut. To overcome this difficulty I have discovered that by leaving that portion of the die containing the guiding-teeth substantially soft the said guiding-teeth may be recut after the cutting-teeth have been hardened or tempered, thus making the guiding-teeth accurate, for it will be remembered that upon the accuracy of the guiding-teeth depends the accuracy of the thread upon the blank. To recut the guiding-teeth I have devised a hob-tap B, which is represented in Fig. 4, the said hob-tap being tempered and provided with a series of leading-threads $b$, which are of exactly the lead or pitch desired for the thread on the screw-blank to be made by the die. The hob-tap at one end of the series of leading-threads is provided with a series of teeth, as at $b'$, which, as the hob-tap is put through the die in the direction of the arrow, acts after passing beyond the cutting-teeth of the die to recut the guiding-teeth of the die. It will be understood that the shank of said hob may be next either the cutting or guiding-teeth.

Referring to Fig. 5, it will be understood that the hob-tap is being put through the die in the direction of the arrow on the said tap. It will also be understood that the side of each guiding-tooth farthest from the front end of the die is the effective side of the tooth—viz., that side which by acting upon the screw-thread of the blank determines the lead of the thread cut on the blank by the cutting-teeth.

In Fig. 5 the dotted lines 2 and the full lines 3 are supposed to represent the shape of the guiding-teeth after the hardening or heating operation; and it will be supposed that the metal of the die has expanded so as to make an imperfect lead; but this in accordance with my invention is overcome by putting the hob-tap through the die, causing the cutting-edges 4 of the hob-tap to act upon and cut away the sides 2 of the guiding-teeth of the die, thus removing any excess of material in the said teeth or truing them to correspond at their acting sides with the exact pitch or lead established by the leading-threads of the hob-tap.

I do not confine myself to the use of the special hob herein described, as any form may be used.

I claim—

1. The herein-described method of manufacturing dies for threading screw-blanks, which consists in providing the die with guiding and with cutting teeth, hardening the cutting-teeth, and thereafter recutting the guiding-teeth, substantially as described.

2. The method of manufacturing dies for threading screw-blanks, it consisting in providing the jaws of the die with cutting-teeth and with guiding-teeth, tempering only the cutting-teeth, thereby leaving the guiding-teeth untempered, and then recutting the said guiding-teeth by the cutting-teeth of a hob-tap according to the lead or pitch of the guiding projections of the said hob-tap, substantially as described.

3. As an improved article of manufacture, a die for threading screw-blanks, it having hardened and tempered cutting projections and unhardened and recut guiding projections, substantially as described.

In testimony whereof I have signed my name to this specification in the presence of two subscribing witnesses.

WALTER L. DIXON.

Witnesses:
E. D. BANCROFT,
H. LAWRENCE.